No. 674,082. Patented May 14, 1901.
W. EASTMAN & W. H. SAYER.
BICYCLE ATTACHMENT.
(Application filed Dec. 26, 1900.)
(No Model.)
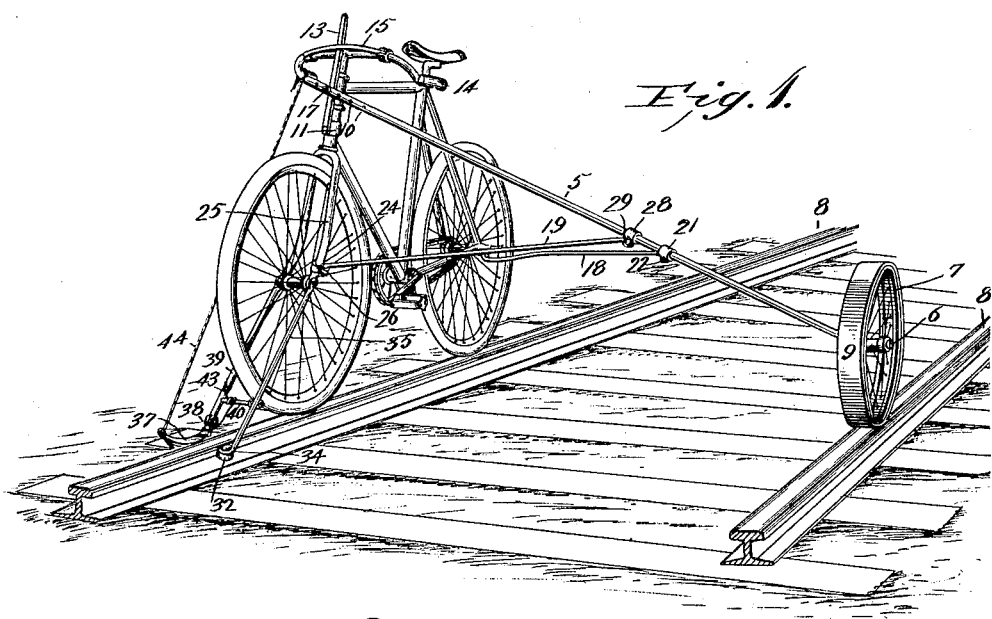
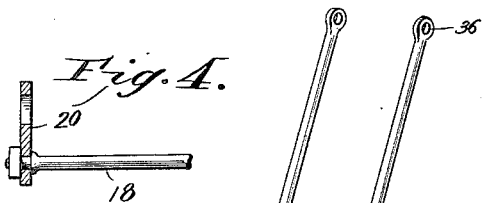
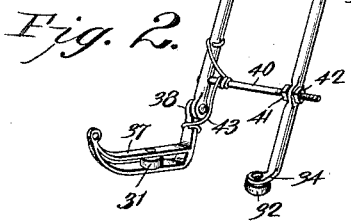
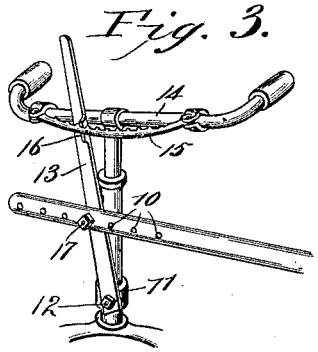
Witnesses
Inventors
W. Eastman
W. H. Sayer
by C. A. Snow & Co.
Attorneys

UNITED STATES PATENT OFFICE.

WILLIAM EASTMAN AND WILLIAM H. SAYER, OF ADAMS, OREGON.

BICYCLE ATTACHMENT.

SPECIFICATION forming part of Letters Patent No. 674,082, dated May 14, 1901.

Application filed December 26, 1900. Serial No. 41,156. (No model.)

*To all whom it may concern:*

Be it known that we, WILLIAM EASTMAN and WILLIAM H. SAYER, citizens of the United States, residing at Adams, in the county of Umatilla and State of Oregon, have invented a new and useful Bicycle Attachment, of which the following is a specification.

This invention relates to attachments for bicycles in general, and more particularly to that class designed to facilitate riding of bicycles upon the rails of railways, the object of the invention being to provide a simple and efficient construction which may be readily applied and removed and which may be manipulated to pass crossings and switches and will permit of adjustment of the inclination of the bicycle to correspond to the slant of the trackway on curves.

Further objects and advantages of the invention will be evident from the following description.

In the drawings forming a portion of this specification, and in which like numerals of reference indicate similar parts in the several views, Figure 1 is a perspective view showing the application of the attachment to a bicycle and illustrating the practical use thereof. Fig. 2 is a detail perspective view of the guiding portion of the attachment. Fig. 3 is a perspective view showing the shifting mechanism for changing the inclination of the bicycle on curves.

Referring now to the drawings, there is shown a common form of bicycle with the attachment secured thereto. This attachment comprises a main brace-bar 5, at one end of which is formed an axle 6 for a wheel 7, which is adapted to run on one of the rails 8 of a railway, and which wheel is provided with a flat rubber tire 9 to prevent noise and unnecessary jarring. This main brace-bar is adapted to lie transversely of the trackway and with an inclination, and at the upper end thereof are formed a series of transverse perforations 10 for adjustably connecting the brace-rod with the bicycle. The bicycle has a collar 11 engaged with the head thereof and provided with a pin 12, on which is pivoted a lever 13, the upper end or handle portion of which extends between the front portion of handle-bar 14 and a rack 15, which latter is disposed to lie parallel with the handle-bar and has its ends attached to the handle-bar. The teeth of this rack project rearwardly in the direction of the handle-bar and the lever is of spring metal, so that it is held normally and yieldably with its knife-edge 16 in engagement with the teeth of the the rack. By drawing the upper end of the lever rearwardly it may be disengaged from the rack, after which it may be shifted to one side or the other. At a point above the fulcrum of the lever there is engaged a bolt 17, and this bolt is adapted to interchangeably engage the perforations in the supporting-bar 5. In order that this adjustment of the connection between the bar and bicycle may not destroy the relation between the bicycle and the wheel 7, tie-rods 18 and 19 are provided.

The tie-rod 18 is engaged at one end with the rear portion of the frame of the bicycle through the medium of a plate 20, which is engaged over the end of the rear axle and held in place by the usual axle-nut that clamps the rear-fork sides. This plate depends from the axle and has an opening through its lower end in which is engaged the end of the rod 18. A nut engaged with the extremity of the rod 18 prevents withdrawal of the rod. The outer end of the rod 18 is diposed between the ends of a collar 21, disposed upon rod or bar 5, and which collar has a clamping-bolt 22 engaged therewith and which passes through the end of the rod 18, whereby when the bolt is screwed up the collar is held from displacement on rod or bar 5 and the rod 18 is held against pivotal movement, as will be understood.

A collar 24 is clamped upon the fork side 25 of the bicycle and has a socket 26 therein, and in this socket is engaged the hooked end of the tie-rod 19, the opposite end thereof being perforated and disposed between the ends of a collar 28, which is disposed on the bar 5. A bolt 29 engages the ends of the collar 28 and passes through the perforation in rod 19 to hold the parts against movement with respect to bar 5. With the collars on bar 5 clamped against movement the bicycle and the wheel 7 may be held in parallel relation, and this relation may be changed to any desired inclination, within certain limits, by shifting the lever 13, as will be seen. This shifting of the inclination of the bicycle and the wheel 7 relatively is to compensate for different inclinations of the track at curves, while the adjustment of the several rods and bars permits of adaptation of the apparatus to different gages and also enables accurate adjustment of a bicycle or of different bicycles to a standard gage.

To prevent the bicycle from leaving the rail 30 on which it runs, guide-rollers 31 and 32 are provided. The roller 32 has its spindle 33 mounted in the forwardly-projected end 34 of a bar 35, having an eye 36 at its upper end which receives one end of the front axle of the bicycle and is held in place by the usual axle-nut. This bar or arm 35 is of such length that when in position it will lie with its roller against the inner side of the ball of the rail, as shown in Fig. 1.

The roller 31 is mounted between the upper and lower sides of a hollow shoe 37, having an upwardly-directed lug 38 at its rear end, which is hinged to the lower end of a rod 39, the upper end of which has an eye which receives the other end of the front axle and is held thereon by the axle-nut. The forward end of the shoe is curved upwardly, so that the shoe, which lies at the outer side of the rail, may ride easily over an intersecting track-rail or other obstruction that may be encountered. A transverse bar 40 connects the two arms or rods and is provided with nuts 41 and 42, whereby the relative positions of the rods may be adjusted.

The shoe 37 is held normally in lowered position by means of a spring-wire 43, which is bent around the bar or bolt 40 and has one end engaged with the rod 39, while the opposite end is engaged with the lug at the rear of the shoe. The effect of this spring is to hold the shoe, with its roller 31, in position for contact with the outer side of the ball of the rail.

In order that the shoe may be raised by the rider without leaving his seat, a cord 44 is attached to the forward end of the shoe and extends upwardly and is attached to the handle-bar of the bicycle. By drawing this cord upwardly the shoe will be raised.

With this construction it will be seen that the bicycle is held in position upon the track-rail and that it may be permitted to lean one way or the other when going around a curve and that the various objects sought are attained.

In practice modifications of the specific construction shown may be made and any suitable materials and proportions may be used for the various parts without departing from the spirit of the invention.

What is claimed is—

1. A bicycle attachment including spaced arms adapted for attachment to the frame of a bicycle, a roller carried by one of the arms and adapted to run against one side face of a rail, a shoe pivoted to the opposite arm, and a roller carried by the shoe for engagement with the face of the rail opposite to the engagement of the first roller, said roller being movable with the shoe to a point above the rail to pass intersecting rails.

2. A bicycle attachment including spaced arms adapted for attachment to the frame of a bicycle, a roller carried by one of the arms and adapted to run against one face of a rail, a shoe pivoted to the opposite arm, a roller carried by the shoe for engagement with the rail opposite to the first roller, the second roller being movable with the shoe to a point above the rail to pass intersecting rails, and means for adjusting the relative positions of the arms to vary the contiguity of the rollers to the rail.

3. The combination with a bicycle, of guide-rollers carried thereby to prevent displacement from a rail, a wheel adapted to run on the opposite rail of a trackway, and means carried by the bicycle and with which the last-named wheel is connected for shifting the wheel to vary the inclination of the bicycle.

4. The combination with a bicycle, of guide-rollers carried thereby to prevent displacement from a rail, a lever pivoted upon the bicycle, a wheel connected with the lever and adapted to run on the opposite rail of a trackway, and means for holding the lever at different points of its movement to vary the inclination of the bicycle.

5. The combination with a bicycle having means for holding it against displacement from the rail of a trackway, of a lever pivoted to the bicycle, a brace-bar pivoted to the lever, a wheel carried by the brace-bar and adapted to run on the opposite rail, and a rack for holding the lever at different points of its pivotal movement, to vary the inclination of the bicycle.

6. The combination with a bicycle having means for holding it against displacement from a rail, of a lever pivoted to the bicycle and having means for holding it at different points of its pivotal movement, a brace-bar adjustably connected with the lever and having a wheel adapted to run on an opposite rail, and tie-rods connected with the bicycle and having adjustable connection with the brace-bar.

7. The combination with a bicycle having means for holding it against displacement from a rail, of a guide adapted to run on an opposite rail of a trackway, and means carried by the bicycle and with which said guide is connected to shift the guide to vary the inclination of the bicycle.

8. The combination with a bicycle having means for holding it against displacement from a railway-rail, of a guide adapted to run on an opposite rail, a lever pivoted to the bicycle and with which said guide is connected for movement thereby to vary the inclination of the bicycle, and a rack for engagement by the lever to hold it against movement, said lever being of spring metal to hold it normally and yieldably in engagement with the rack.

In testimony that we claim the foregoing as our own we have hereto affixed our signatures in the presence of two witnesses.

WILLIAM EASTMAN.
WILLIAM H. SAYER.

Witnesses:
W. H. FOWLER,
B. B. HALL.